2 Sheets—Sheet 1.
C. B. HOLDEN,
Assignor to J. E. WISNER.
Horse Hay-Rake.
No. 9,133. Reissued Mar. 30, 1880.
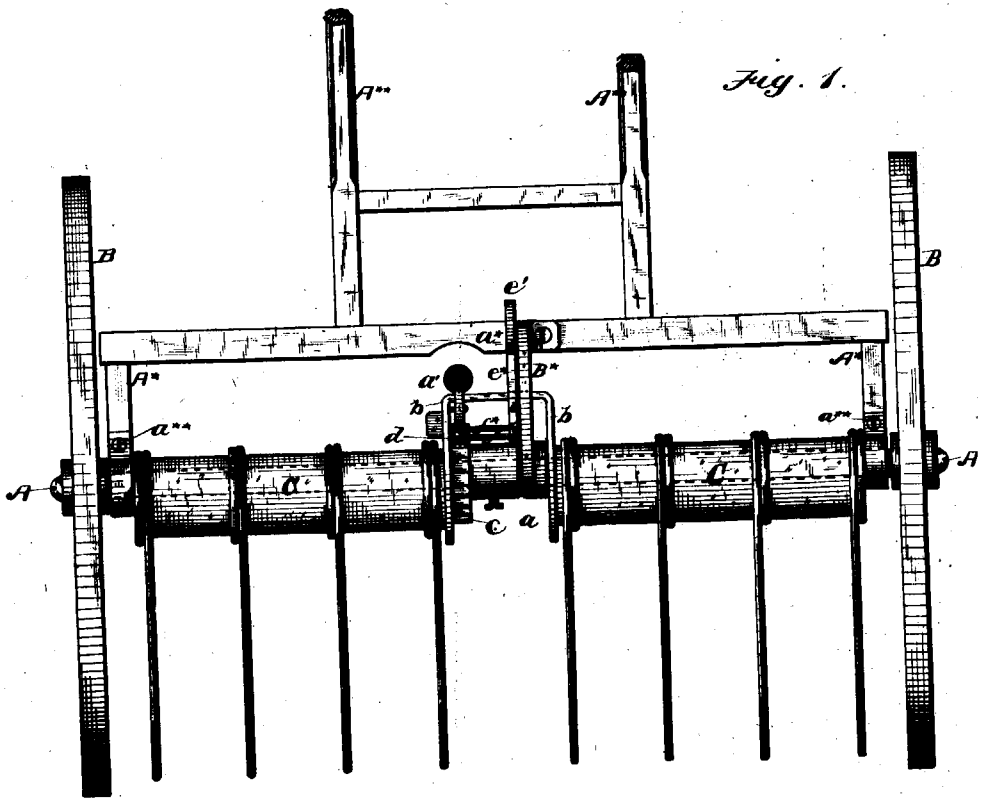
Attest,
W. H. H. Knight
W. S. Pond.
Inventor,
Cyrus B. Holden
By L. Hill,
His Atty.
N. PETERS, PHOTO-LITHOGRAPHER, WASHINGTON, D. C.

2 Sheets—Sheet 2.

C. B. HOLDEN,

Assignor to J. E. WISNER.

Horse Hay-Rake.

No. 9,133. Reissued Mar. 30, 1880.

Attest,
W. H. H. Knight
H. S. Pond

Inventor,
Cyrus B. Holden,
By L. Hice,
His atty.

N. PETERS, PHOTO-LITHOGRAPHER, WASHINGTON, D. C.

UNITED STATES PATENT OFFICE.

CYRUS B. HOLDEN, OF WORCESTER, MASSACHUSETTS, ASSIGNOR TO JAMES E. WISNER, OF FRIENDSHIP, NEW YORK.

HORSE HAY-RAKE.

SPECIFICATION forming part of Reissued Letters Patent No. 9,133, dated March 30, 1880.

Original No. 76,760, dated April 14, 1868; Reissue No. 8,475, dated November 5, 1878. Application for reissue filed February 21, 1880.

*To all whom it may concern:*

Be it known that I, CYRUS B. HOLDEN, of Worcester, in the county of Worcester and State of Massachusetts, have invented certain new and useful Improvements in Horse Hay-Rakes; and I do hereby declare the following to be a full, clear, and exact description of the same, reference being had to the accompanying drawings, forming part of this specification, in which—

Figure 3:
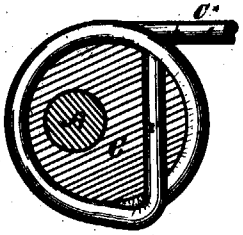
Figure 2:
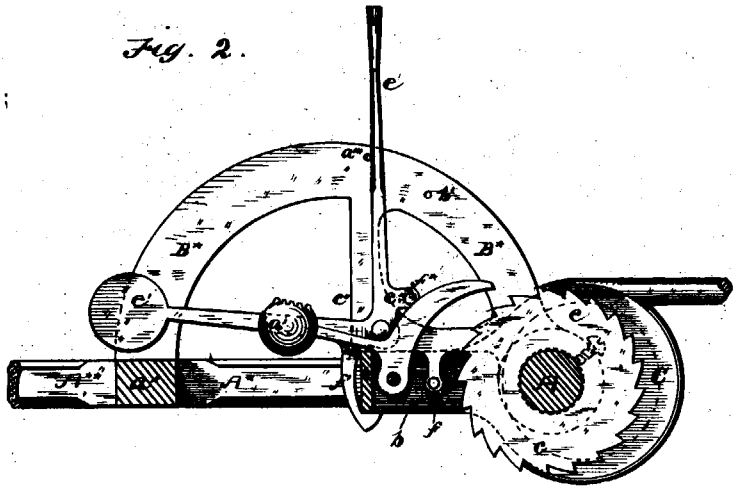

Figure 1 is a plan view of a hay-rake made according to my invention. Fig. 2 is a vertical longitudinal section of the same; and Fig. 3 is a transverse section, on an enlarged scale, of one portion of the same.

Similar letters of reference in the several figures denote the same parts.

This invention relates to that class of wheeled hay-rakes in which the rake-teeth are tilted or lifted to discharge the hay in windrows by the traction of the apparatus, instead of by the employment of the muscular power of the attendant.

It consists, first, in combining, with an oscillating continuously-rigid rake-head and a constantly-rotating lifting-wheel arranged on the axle between the carriage-wheels, a locking pawl or dog supported by and upon the rake-head and capable of engaging, at the will of the operator, directly with the lifting-wheel, whereby the rake-head and lifting-wheel are locked directly and rigidly together during the forward movement of the rake in the act of dumping the hay; secondly, in a continuously-rigid oscillating rake-head mounted upon a rotating axle as its center of oscillation, and having bearings through which the axle rotates when the rake is advancing; thirdly, in a continuously-rigid oscillating rake-head mounted on a rotating axle as its center of oscillation, in combination with a rotating ratchet-wheel and a device for connecting the rake-head to the ratchet-wheel, at the will of the operator, for the purpose of raising the teeth and discharging the hay when the rake is advancing; fourthly, in a rake-head composed of two parts rigidly connected by a yoke, in combination with a ratchet-wheel rotating between the parts when the rake is advancing, and a device for connecting the rake-head to the ratchet-wheel, at the will of the operator, for the purpose of raising the teeth and discharging the hay; fifthly, in combining a revolving axle, a continuously-rigid rocking head mounted on said axle as its center of oscillation, a lifting ratchet-wheel attached to said axle and revolving therewith, a pawl or detent attached to the head and capable of engaging with the ratchet-wheel, at the will of the operator, to dump the load, and a stop against which the pawl or detent strikes at its extreme forward movement to automatically release it from the ratchet and reset the rake-teeth; sixthly, in combining the draft-frame of the rake directly with the revolving axle by means of three connections—viz., one at or near each wheel-hub and one at or near the middle of the rake—whereby the axle is properly supported and the continuously-rigid rake-head is relieved from accidental strains; and, lastly, in a peculiar construction and arrangement of the rake-head upon the axle, whereby the teeth are attached to and supported directly by a single bar or shaft without the intervention of a lifting-bar or tooth-guide, and whereby the spring of the teeth is increased in range, and the whole structure is rendered exceedingly simple and compact.

To enable others to understand the construction and operation of my invention, I will proceed to describe it with reference to the drawings.

The rake is formed with a cylindrical axle, A, provided with the two supporting-wheels B, one of which is firmly keyed or otherwise attached to said axle, while the other is loose thereon, so that the axle will revolve continuously forward while the rake is advancing, and at the same time provision will be made for any unequal movement of the supporting-wheels.

A* is a horizontal draft-frame affixed to the thills A**, by which the rake is drawn, and supported by said thills and by the axle, to which it is articulated near the inner ends of the supporting-wheel hubs. Said draft-frame is constructed with a stout cross-bar, *a, attached to the rear ends of the thills and projecting laterally beyond their sides in a direction parallel to the axle, and to such a distance as to provide a suitable support for the two connecting-pieces $a^{}$ $a^{**}$, which extend to the axle and are hinged thereto near the wheel-hubs, as above described.

This construction enables the rear ends of the thills to be arranged at a suitable distance apart, and at the same time transfers the draft-strains to the axle at points so close to its terminal bearings that it will be thereby protected from accidental bending under said strains.

C is the rake-head, to which are connected the gathering-teeth. This head is so constructed as to be capable of oscillating to raise and drop the teeth for the purposes of dumping the gathered hay and resetting the rake for work; and it is so mounted on the rake that its center of oscillation coincides with the center of rotation of the axle, whereby those parts of the dumping mechanism that are connected respectively to the axle and rake-head are not displaced or thrown out of their proper relative position by the oscillation of the head or rotation of the axle.

The form of the rake-head is designed for the direct attachment of the teeth to it without the necessity of other support for them, and its special mode of support upon the axle has the effect of bringing the parts close together, rendering the rake structure simple and compact. To these ends the head is made tubular, of cylindrical form, and with a longitudinal bore, which is eccentric thereto, as shown more fully in Figs. 2 and 3, and has passed through it the axle A, just mentioned.

The head C, instead of being formed of one continuous piece, is made in two parts, the innermost ends of which are at some little space apart, as shown at *a*, and which are connected by a forwardly-extending yoke, *b*, as indicated in Fig. 1.

The eccentric form, just hereinbefore described, of the tubular head C causes one side thereof to be much thicker than the other, so that holes may be provided transversely therein, as shown in Fig. 3, in such manner that the inner ends, $a''$, of the wire teeth C* may be passed through and secured in such holes, the teeth being coiled one or more times around the aforesaid head, and having their main length or portion of an ordinary or suitable form or curvature.

Attached to the axle in the space *a* between the two parts of the tubular head is a ratchet, *c*, and pivoted to one side of the yoke *b* is a pawl, *d*, provided with a weight, $a'$, which operates to keep the pawl out of gear or contact with the ratchet *c*, except when the same is acted upon by the lever *e*, as hereinafter fully explained.

The lever *e* is pivoted at $c''$ to the lower part of a semicircular vertical frame, B*, which extends from the axle at the space *a*, just hereinbefore mentioned, to the cross-bar $a^*$ of the draft-frame A*, the frame B* having provided upon it two studs, $a'''$ $b'$, which limit the vibratory movement of the lever.

The lever *e* is formed with a forwardly-extending arm, $e^*$, having at its extremity a weight, $e'$, which tilts forward the lever, which, furthermore, has at one side a stud or pin, $f^*$, which extends over the pawl *d* in such manner as to force such pawl into gear with the ratchet *c* when the lever *e* is pulled back.

Extending downward from the lever *e* is a hook, $f'$, which, when the lever is thrown forward by the weight $e'$, catches under the front or forward part of the yoke *b*, and thus prevents the rising of the rake-teeth C* while gathering the hay or grass, as hereinafter more fully explained.

Provided upon the lower part of the frame B*, and below the pawl *d*, is a stud, *f*.

When the rake is drawn forward, with the hook $f'$ under the front of the yoke *b*, the teeth C* are prevented from tilting upward, and the grass or hay is gathered before them until it is desired to deposit the same in a windrow, whereupon the lever *e* is moved back and presses the pawl *d* into gear or contact with the ratchet *c*. The ratchet *c*, attached to the axle, rotated by the wheel B, firmly secured thereto, being thus connected with the pawl *d* of the head C, carries the same around a portion of a revolution, thereby raising or tilting upward the teeth and discharging the hay or grass therefrom. By the time this is done the pawl *d* strikes the stud *f*, which, by preventing its further movement in a downward direction, brings it clear from the ratchet-wheel *c*, thus enabling the teeth C* to fall by their own weight to their first position. When the lever *e* is released it is brought forward to its original place by the weight $e'$, with its hook $f'$ catching underneath the front of the yoke *b*, to hold the teeth in place while gathering the hay for the next windrow or deposit, while the pawl *d* is kept clear of the ratchet *c* by means of its weight $a'$, all as hereinabove explained.

It will be observed that the connection from the rake-head to the lifting-wheel, at the will of the operator, to dump the hay is effected by a single directly-connecting detent or pawl having its support upon the rake-head, and therefore moving therewith at all times, and connecting directly and immediately to the lifting-wheel. As the oscillation of the rake-head is centered on the axle, and the connecting device is supported on the rake-head, it follows that the connecting device and the lifting-wheel will, when locked together, rotate forward on the same center, and therefore keep in engagement with each other.

By making the rake-head rigid from end to end and bringing the center of rotation of the lifting-wheel to substantially coincide with the center of oscillation of the rake-head, the lifting-wheel and rake-head are enabled to be thus locked together by a direct and rigid connection, and the necessity for the complicated and cumbersome connecting devices heretofore used in revolving-axle hay-rakes is avoided, the weight and cost of the rake reduced, the whole construction simplified, and its practical operation greatly improved. The direct connection of the rake-head and lifting-wheel, with their movement upon practically the same center, also greatly reduces the power required for lifting the teeth to dump the gathered hay.

I am aware that heretofore rake-teeth have been attached directly to an oscillating axle, which thereby became an oscillating rake-head.

I am also aware that rake-teeth have been attached directly to an intermittently-rotating axle which carried them entirely around with it.

I am also aware that an oscillating rake-head, or a rigid frame which is the equivalent thereof, has been mounted directly upon a non-revolving axle as its center of oscillation, as shown in the patent of D. B. Woodward, dated February 19, 1861.

I am also aware that rake-teeth have been strung loosely upon a revolving axle with their ends extending in front thereof, and have been combined with a yoke or bar resting upon their front extremities, by depressing which they could all be raised to dump the hay, and with another yoke or bar resting upon them back of the axle, by depressing which they could all be held down to their work, and with another bar beneath them to support them in proper raking position, as shown in the patent of H. W. Sabin, dated December 3, A. D. 1850, and since extended and reissued in several divisions.

I am also aware that rakes have been made having an oscillating rake-head and a revolving axle, but arranged with the center of oscillation so far from the center of rotation as to require the intervention of a flexible connection of considerable length and composed of several connected parts, as shown in the patents of G. Pierce, dated November 29, 1859, and Joseph H. Shireman, dated, respectively, September 9, 1862, and October 8, 1867; and I do not claim any of said rakes, nor anything that is the mere equivalent thereof.

My invention is limited to a rake in which the teeth are not attached directly to the axle, but to a rake-head intervening between them and the axle. It is further limited to a rake in which the rake-head is a continuously-rigid structure, so that the power which raises them, holds them down to their work, and controls their raking position is all transmitted to them through one and the same structure, which I term the "rake-head," in contradistinction to the construction shown in said Sabin patent, in which such power is transmitted through several different and independent devices. It is further limited to a rake in which the center of oscillation of the rake-head structure and the center of rotation of the axle are so coincident that the rake-head and lifting-wheel can be locked rigidly together without danger of disengaging by the movement of the parts in dumping, and without requiring an unnecessary amount of power to raise the teeth.

I claim as my invention—

1. In a horse hay-rake, the combination of a rigid oscillating rake-head, a constantly-rotating lifting-wheel arranged on the axle between the carriage-wheels, and a locking pawl or dog supported upon the rake-head and capable of engaging, at the will of the operator, directly with the lifting-wheel, whereby the rake-head and lifting-wheel are locked rigidly together during the forward movement of the rake in the act of dumping, without danger of disengagement by their movement, substantially as described.

2. In a horse hay-rake, a rigid oscillating rake-head mounted upon a rotating axle as its center of oscillation, substantially as described.

3. The combination of a rigid oscillating rake-head mounted on a rotating axle as its center of oscillation, a rotating ratchet-wheel, and a device for connecting the rake-head to the ratchet-wheel, at the will of the operator, for the purpose of raising the teeth and discharging the hay when the rake is advancing, substantially as described.

4. The combination of a rake-head composed of two parts rigidly connected by a yoke with a ratchet-wheel rotating between the parts when the rake is advancing, and with a device for connecting the rake-head to the ratchet-wheel, at the will of the operator, for the purpose of raising the teeth and discharging the hay, substantially as described.

5. The combination of a revolving axle, a rigid rocking head mounted on said axle as its center of oscillation, a lifting ratchet-wheel mounted on said axle and revolving therewith, a pawl or detent attached to the head and capable of engaging with the ratchet-wheel, at the will of the operator, to dump the load, and a stop against which the pawl or detent strikes at its extreme forward movement to automatically release it from the ratchet and reset the rake-teeth, substantially as described.

6. In a horse hay-rake, the combination of a continuously-revolving axle with a draft-frame, and with three direct connections from the draft-frame to the axle—viz., one at or near each carriage-wheel hub and a third at or near the middle of the rake—whereby the axle is properly supported by the draft-frame and the rigid oscillating rake-head is relieved from the necessity of supporting the middle of the axle against strains, substantially as described.

7. In a wheeled horse hay-rake, a revolving axle having a central lifting-wheel, combined with a draft-frame having a long rear cross-bar, *a**, with end and middle connections to the axle, constituting bearings in which said axle rotates, substantially as described.

8. The tubular head C, composed of two parts connected by the yoke *b*, in combination with the axle A, the ratchet *c*, and pawl *d*, substantially as and for the purpose specified.

9. The arrangement and combination of the hook *f'* and yoke *b* with the tubular head C and its teeth C*, substantially as set forth.

10. The tubular head C, arranged eccentrically upon the axle A in such manner as to permit the innermost ends of the teeth C* to be passed through such tubular head without interfering with the axle, substantially as and for the purpose specified.

C. B. HOLDEN.

Witnesses:
CHARLES A. MERRILL,
E. M. KINGSBURY.